US009750057B2

(12) United States Patent
Wentink

(10) Patent No.: US 9,750,057 B2
(45) Date of Patent: Aug. 29, 2017

(54) CONTENTION CONTROL MECHANISM

(71) Applicant: QUALCOMM Incorporated, San Diego, CA (US)

(72) Inventor: Maarten Menzo Wentink, Naarden (NL)

(73) Assignee: QUALCOMM Incorporated, San Deigo, CA (US)

( * ) Notice: Subject to any disclaimer, the term of this patent is extended or adjusted under 35 U.S.C. 154(b) by 188 days.

(21) Appl. No.: 14/292,006

(22) Filed: May 30, 2014

(65) Prior Publication Data

US 2015/0016437 A1    Jan. 15, 2015

Related U.S. Application Data

(66) Substitute for application No. 61/844,834, filed on Jul. 10, 2013.

(60) Provisional application No. 61/844,261, filed on Jul. 9, 2013.

(51) Int. Cl.
*H04W 74/08* (2009.01)

(52) U.S. Cl.
CPC ......... *H04W 74/085* (2013.01); *H04W 74/08* (2013.01)

(58) Field of Classification Search
None
See application file for complete search history.

(56) References Cited

U.S. PATENT DOCUMENTS

2007/0070902 A1* 3/2007 Elaoud ............... H04L 12/5695
                                                            370/231
2007/0214379 A1* 9/2007 Abraham ............... H04L 45/20
                                                            714/4.1
2008/0025342 A1  1/2008  Kim et al.
(Continued)

FOREIGN PATENT DOCUMENTS

WO    WO-2011053775 A1    5/2011

OTHER PUBLICATIONS

ISA/EPO, International Search Report and Written Opinion of the International Searching Authority, Int'l App. No. PCT/US2014/045379, Oct. 20, 2014, European Patent Office, Rijswijk, NL, 12 pgs.

(Continued)

*Primary Examiner* — Kouroush Mohebbi
(74) *Attorney, Agent, or Firm* — Holland & Hart LLP

(57) ABSTRACT

Methods, systems, and devices are described for enhanced network utilization between an access point and a number of wireless stations. A station (STA), following a transmit opportunity (TXOP), may determine a utilization of the TXOP. Based on the determination, the STA may adjust a delay time for a subsequent transmission. The adjustment of the delay time may include increasing an initial contention window (CW), increasing a backoff value, and/or increasing a number of backoffs for TXOPs following an underutilized TXOP. The increased delay time may result in, on average, increased backoff times in such situations. The delay time may be reduced to a minimum delay time following a certain number of TXOPs that more fully utilize the TXOP. Utilization of the TXOP may be determined based on an amount of time used for the TXOP relative to a TXOP limit that may be set by an access point.

26 Claims, 13 Drawing Sheets

(56) References Cited

U.S. PATENT DOCUMENTS

2012/0051342 A1   3/2012 Liu et al.

OTHER PUBLICATIONS

Siwamogsatham, "A Novel Smart-DCF Scheme for High-Speed WLANs," 2007 International Symposium on Communications and Information Technologies, ISCIT '07, Sydney, Australia, Oct. 17-19, 2007, pp. 1032-1037, E-ISBN 978-1-4244-0977-8, IEEE.
Siwamogsatham, "On Backoff Timer Scheduling for Smart-DCF and Performance Evaluation," 2008 22nd International Conference on Advanced Information Networking and Applications—Workshops, AINAW 2008, Okinawa, Japan, Mar. 25-28, 2008, pp. 1278-1284, ISBN 978-0-7695-3096-3, IEEE.

* cited by examiner

CONTENTION CONTROL MECHANISM

CROSS REFERENCES

The present application for patent claims priority to U.S. Provisional Patent Application No. 61/844,261 by Wentink, entitled "Contention Control Mechanism," filed Jul. 9, 2013, assigned to the assignee hereof, and expressly incorporated by reference herein. The present application for patent also claims priority to U.S. Provisional Patent Application 61/844,834 by Wentink, entitled "Contention Control Mechanism," filed Jul. 10, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of network devices such as access points (APs) that can support communication for a number of wireless stations. A wireless station (STA) may communicate with a network device bidirectionally. For example, in a wireless local area network (WLAN), a STA may communicate with an associated AP via downlink and uplink. The downlink (or forward link) refers to the communication link from the AP to the STA, and the uplink (or reverse link) refers to the communication link from the STA to the AP.

In WLANs, there may be cases in which multiple STAs are in communication with a particular AP. Access to the wireless medium may be controlled through a medium access control (MAC), which may allow different STAs to access a wireless channel according to enhanced distributed channel access (EDCA) rules. Included in the EDCA rules is a transmit opportunity (TXOP) limit, which is a duration of time during which a STA is allowed to continually access the medium without backoff. In some deployments, a wireless network may have four different access priorities according to an access class (AC) of data that is transmitted using the wireless channel, each of which may have a different TXOP limit.

In order to enhance utilization of the wireless network, it would be desirable for different STAs accessing the wireless network to utilize relatively fewer TXOPs with each containing more data for transmission rather than relatively more TXOPs with each containing less data for transmission, while still maintaining quality of service (QoS) criteria for a particular AC of data.

SUMMARY

Various methods, systems, devices, and apparatuses are described for enhanced network utilization in a wireless communications system through efficient transmissions of information between an access point (AP) and a station (STA). A STA in a wireless communications network may, following a transmit opportunity (TXOP), determine a utilization of the TXOP. Based on the determination, the STA may adjust a delay time for a subsequent transmission. The adjustment of the delay time may include increasing an initial contention window (CW) size, increasing a backoff value, and/or increasing a number of backoffs for TXOPs following an underutilized TXOP. An increase in the initial CW may result in, on average, increase in backoff times, which may lead to increase in the amount of data that is transmitted in the subsequent TXOP and thereby enhance network utilization. The delay time may be reduced to a minimum delay time following a certain number of TXOPs that more fully utilize the TXOP. Utilization of the TXOP may be determined based on an amount of time used for the TXOP relative to a TXOP limit that may be set by an AP.

According to an aspect of the disclosure, a method for wireless communications is provided. The method generally includes determining a utilization of a transmit opportunity (TXOP) during a transmission of data from a wireless communication device, and adjusting a delay time for a subsequent transmission from the wireless communication device based on the determined utilization. Adjusting the delay time may include, for example, increasing an initial CW value, increasing a backoff value, and/or increasing a number of backoffs, when the utilization is less than a predetermined utilization. Adjusting may also include decreasing the delay time when the utilization is greater than a predetermined utilization, or decreasing the delay time when the utilization is greater than a predetermined utilization and the utilization of a predetermined number of previous TXOPs are each greater than the predetermined utilization.

In some examples, the determining may include determining a time duration during which data is transmitted during a transmit opportunity (TXOP) and adjusting the delay time by increasing the delay time when the time duration is shorter than a predetermined time duration. In other examples, the determining may include determining a maximum duration of the TXOP, determining a time duration during which data is transmitted during the TXOP, and determining a ratio of the time duration and the maximum duration. In some such examples, adjusting the delay time may include increasing the delay time when the ratio is less than a predetermined ratio. Additionally or alternatively, adjusting the delay time may include one or more of adjusting the delay time to allow for accumulation of additional data prior to the subsequent transmission relative to an amount of data accumulated using an unadjusted delay time or scaling the delay time according to the utilization of the TXOP.

In some examples, adjusting the delay time may include increasing the delay time by a first amount when the utilization is less than a predetermined utilization, and increasing the delay time by a second amount when the utilization of a subsequent TXOP is less than the predetermined utilization. In other examples, the method may also include determining a second utilization of a subsequent TXOP during the subsequent transmission of data from a wireless communication device, and re-adjusting the delay time responsive to the utilization and second utilization. Re-adjusting the delay time may include, for example, resetting the delay time to a minimum value when the second utilization is greater than a predetermined utilization, or further increasing the delay time when the second utilization is less than a predetermined utilization.

Another aspect of the disclosure provides an apparatus for wireless communications. The apparatus generally includes means for determining a utilization of a transmit opportunity (TXOP) during a transmission of data from a wireless communication device, and means for adjusting a delay time for a subsequent transmission from the wireless communication device based on the determined utilization. The means for adjusting the CW value may include, for example, one or more of means for increasing a CW value, increasing a backoff value, or increasing a number of backoffs when the utilization is less than a predetermined utilization. The means for adjusting may also include, for example, means for decreasing the delay time when the utilization is greater than a predetermined utilization, means for decreasing the delay time when the utilization is greater than a predetermined utilization and the utilization of a predetermined number of previous TXOPs are each greater than the predetermined utilization, means for scaling the delay time according to the utilization of the TXOP, or means for increasing the delay time by a first amount when the utilization is less than a predetermined utilization and increasing the delay time by a second amount when the utilization of a subsequent TXOP is less than the predetermined utilization.

In some examples, the means for determining may include means for determining a time duration during which data is transmitted during a transmit opportunity (TXOP). In some of such examples, the means for adjusting the delay time may include means for increasing the delay time when the time duration is shorter than a predetermined time duration. In other examples, the means for determining may include means for determining a maximum duration of the TXOP, means for determining a time duration during which data is transmitted during the TXOP, and means for determining a ratio of the time duration and the maximum duration. In some of such examples, the means for adjusting the delay time may include means for increasing the delay time when the ratio is less than a predetermined ratio.

In some examples, the apparatus may also include means for determining a second utilization of a subsequent TXOP during the subsequent transmission of data from a wireless communication device, and means for re-adjusting the delay time responsive to the utilization and second utilization. The means for re-adjusting the delay time may include, for example, means for resetting the delay time to a minimum value when the second utilization is greater than a predetermined utilization, or means for further increasing the delay time when the second utilization is less than a predetermined utilization.

In another aspect, an apparatus for wireless communication is provided. The apparatus generally includes a receiver configure to receive wireless communications form an access point and a transmitter configured to transmit data to the access point during a transmit opportunity (TXOP). The apparatus also includes a delay time manager configured to determine a utilization of a transmit opportunity (TXOP) during a transmission of data from a wireless communication device, and adjust a delay time for a subsequent transmission from the wireless communication device based on the determined utilization.

In certain examples, the apparatus for wireless communication may be configured to implement one or more aspects of the functionality described above with reference to the method for wireless communications.

In another aspect, a non-transitory computer readable medium is provided having computer-readable program code stored thereon that when executed by at least one processor causes the at least one processor to determine a utilization of a transmit opportunity (TXOP) during a transmission of data from a wireless communication device and adjust a delay time for a subsequent transmission from the wireless communication device based on the determined utilization.

In certain examples, the computer-readable program code may further cause the at least one processor to perform one or more aspects of the functionality described above with reference to the method for wireless communications.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Described examples are directed to methods, systems, devices, and apparatuses for accessing a wireless channel in a wireless communications network that may enhance network utilization and power conservation through efficient transmissions of information between an access point (AP) and a station (STA). A STA in a wireless communications network may, following a transmit opportunity (TXOP), determine a utilization of the TXOP. Utilization, in some cases, may be determined based on an amount of time used for the TXOP relative to a TXOP limit that may be set by the AP. Based on the determination, the STA may adjust a delay time for a subsequent transmission. The adjustment of the delay time may include increasing or decreasing an initial contention window (CW) size, increasing or decreasing a backoff value, and/or increasing or decreasing a number of backoffs for TXOPs following an underutilized TXOP or a fully utilized TXOP. In the case of the underutilized TXOP, the delay time may be increased by increasing the initial CW size. This may result in, on average, increase in backoff times, which may lead to an increase in the amount of data to be transmitted in the subsequent TXOP thereby enhancing network utilization. For the fully utilized TXOP, in some cases, the initial delay time may be reduced to a minimum delay time following a certain number of TXOPs that more fully utilize the TXOP.

The channel access techniques presented herein are generally described in connection with WLANs for simplicity. A WLAN (or Wi-Fi network) may refer to a network that is based on the protocols described in the various IEEE 802.11 standards (e.g., 802.11a/g, 802.11n, 802.11ac, 802.11ah, etc.). The same or similar techniques, however, may be used for various other wireless communications systems such as cellular wireless systems, peer-to-peer wireless communications, ad hoc networks, satellite communications systems, and other systems. The terms "system" and "network" may be used interchangeably.

Thus, the following description provides examples, and is not limiting of the scope, applicability, or configuration set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 1:
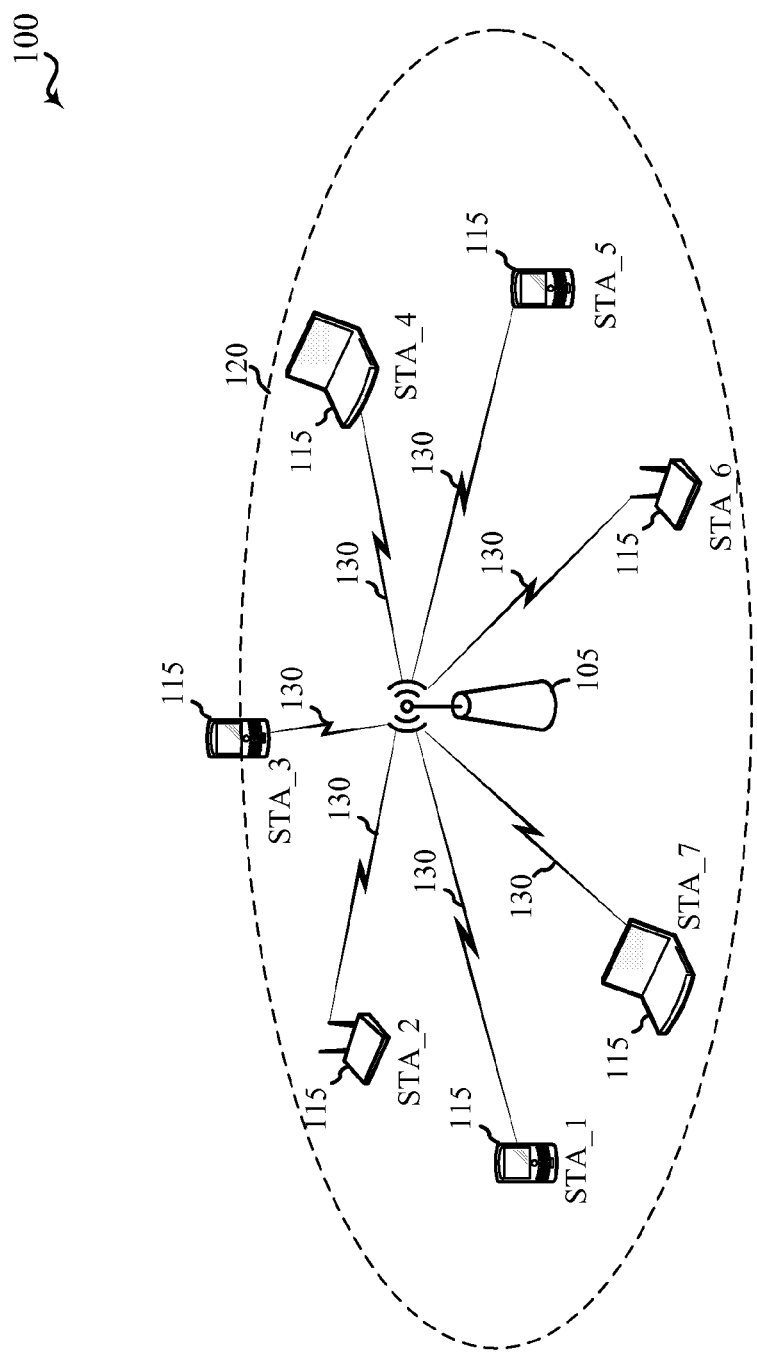
FIG. 1 shows a diagram that illustrates an example of a wireless local area network (WLAN) that supports enhanced network utilization according to various examples.

Referring first to FIG. 1, a wireless communications network 100, such as WLAN or Wi-Fi network is shown that is configured to provide enhanced network utilization according to the aspects of the disclosure. The WLAN network 100 includes an AP 105 and multiple associated STAs 115. In this example, there are shown seven (7) STAs 115, which are identified as STA_1, STA_2, STA_3, STA_4, STA_5, STA_6, and STA_7. The WLAN network 100, however, may have more or fewer STAs 115 than those shown in FIG. 1 since the number shown is simply for illustrative purposes. The AP 105 and the associated STAs 115 may represent a basic service set (BSS). The various STAs 115 in the BSS are able to communicate with one another through the AP 105. Also shown is a coverage area 120 of the AP 105, which may represent a basic service area (BSA) of the WLAN network 100. Although not shown in FIG. 1, the BSS associated with the WLAN 100 is typically connected to a wired or wireless distribution system (DS) that allows multiple APs to be connected in an extended service set.

The AP 105 is configured to communicate bi-directionally with each of the STAs 115 using transmissions 130. The transmissions 130 may include downlink transmissions (e.g., beacon frames) that are sent from the AP 105 to a STA 115 as well as uplink transmissions of data frames that are sent from a STA 115 to the AP 105, which are referred to as transmission opportunities (TXOPs). Simultaneous transmissions by different STAs 115 over the wireless medium in the wireless communications network 100 may result in collisions between the transmissions which may degrade the efficiency of the wireless communications network 100. Collisions between STAs 115 may be resolved according to contention mechanisms that result in the STAs 115 attempting to retransmit a communication following a backoff period, as will be described in more detail below. A STA 115 that sends many short TXOPs separated by a backoff will have a much higher contention activity than a STA 115 that groups traffic into longer but fewer TXOPs. In various examples, the latter may be implemented according to various techniques for adjusting a delay time prior to initiating a subsequent transmission following an underutilized TXOP, as will be described in more detail below. Such delay time adjustment may result in relatively fewer TXOPs that may result in less contention and therefore fewer collisions. This may result in enhanced network efficiency, as well as reduced power consumption at both the STAs 115 and AP 105.

Figure 2:
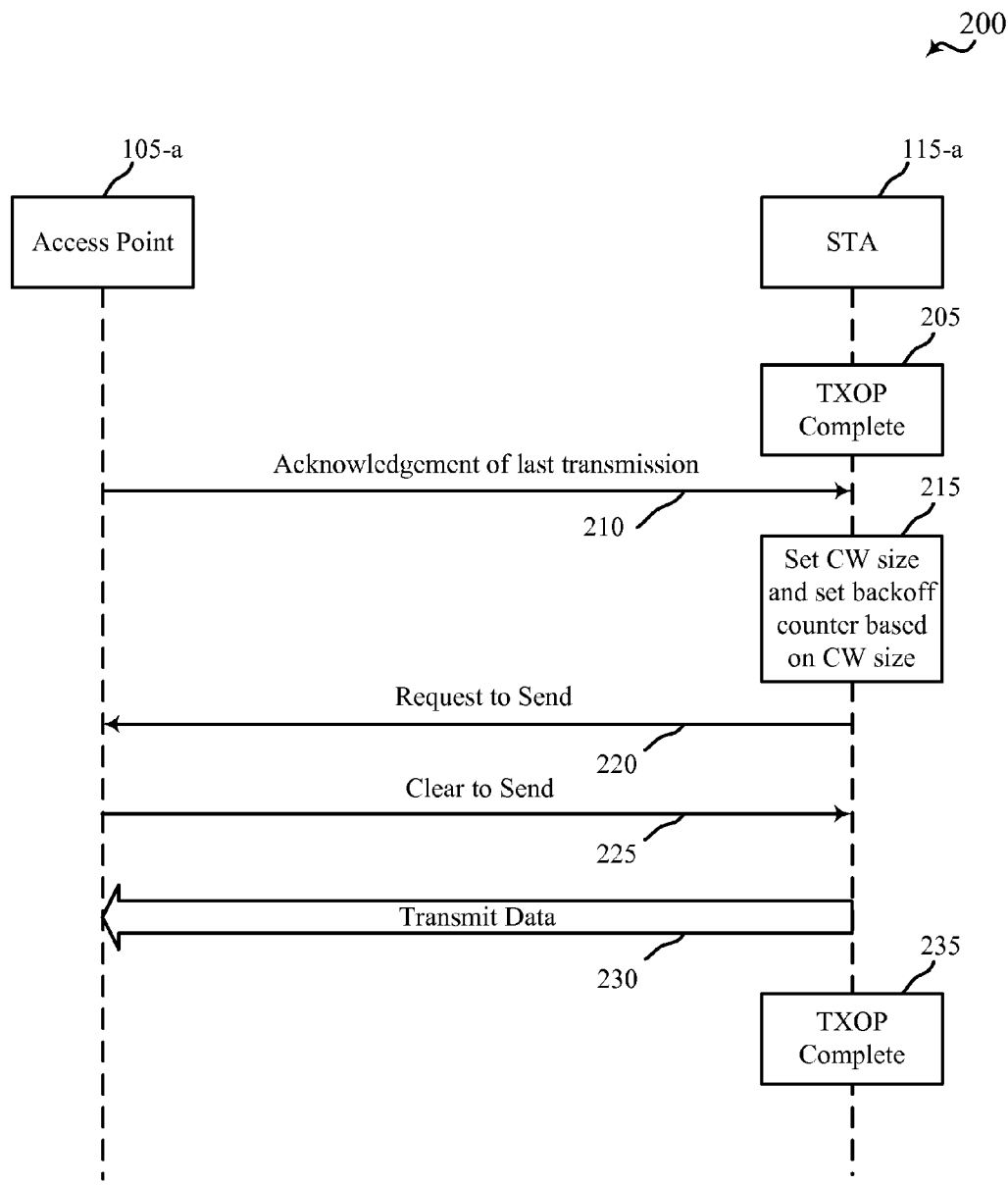
FIG. 2 shows a diagram that illustrates an example of a frame exchange between an access point (AP) and a station (STA) according to various examples.

With reference now to FIG. 2, an example 200 of transmissions between a STA 115-a and an AP 105-a is described. The STA 115-a and AP 105-a may be examples of STAs 115 and AP 105 of FIG. 1. In the example shown, the STA 115-a is assumed to have completed a TXOP as indicated at block 205. In response to a successfully received transmission, the AP 105-a may transmit an acknowledgment 210 to the STA 115-a. According to one example, for each successfully received frame, the AP 105-a may send an acknowledgement (ACK) frame after a short interframe space (SIFS), which is shorter than the DIFS, and thus does not result in other stations attempting to gain access to the medium. Other stations resume the backoff process after the DIFS idle time. In the absence of the ACK frame, the STA may determine that the transmission was not successful in which case the STA 115-a may retransmit the data after another random backoff. After determining that the data was transmitted successfully or not, the STA 115-a may set a contention window (CW) size and a backoff counter based on the CW size, as indicated at block 215. The backoff counter may be determined as a random integer drawn from a uniform distribution over the interval [0,CW]. The CW size, according to various examples, may be calculated according to different techniques in order to enhance network efficiency while maintaining required Quality of Service (QoS) for a given access class (AC), as will be described in further detail below. If the channel becomes busy during a backoff process, the backoff counter may be suspended. When the channel becomes idle again, and stays idle for an extra distributed coordination function (DCF) interframe space (DIFS) time interval, the backoff process resumes with the suspended backoff counter value.

Following the expiration of the backoff counter, the STA 115-a may, according to the example of FIG. 2, transmit a request to send (RTS) 220 to the AP 105-*a*. In the event that there is no collision with another STA, the AP 105-*a* of this example may send a clear to send (CTS) indication 225 to the STA 115-*a*. Such RTS/CTS transmissions may be implemented in some examples to reduce frame collisions, although other examples may not implement RTS/CTS communications. The STA 115-*a* may then transmit data to the AP 105-*a* as indicated at 230. Following the TXOP limit, or the transmission of all of the data in a buffer at the STA 115-*a*, the TXOP is assumed to be completed as indicated by block 235, and the process then repeats.

In some examples, the CW may be set (or reset) after a successful TXOP to a minimum CW size (CWmin), where CWmin is the minimum CW for the AC for which the TXOP was obtained. The CW that is used after a successful TXOP is referred to as the initial CW. In various examples described herein, the delay time from completion of a TXOP to the start of a subsequent TXOP may be adjusted to enhance efficiency of the network by using one or a number of mechanisms. For example, the delay time may be adjusted, by adjusting an initial CW for subsequent transmissions, by adjusting a backoff value directly for subsequent transmissions, and/or by adjusting a number of backoffs before initiating a subsequent TXOP. In case of an unsuccessful transmission, the delay time may be increased by increasing the CW per the Enhanced Distributed Channel Access (EDCA) rules. For example, following an unsuccessful transmission attempt, another backoff is performed using a new CW value updated by 2*(CW+1)−1, with an upper bound of CWmax. CWmin and CWmax may be set by the AP 105-*a* according to a particular AC and QoS requirements of the different ACs. The new CW value and selected backoff time reduces the collision probability in case there are multiple STAs attempting to access the channel.

Figure 3:
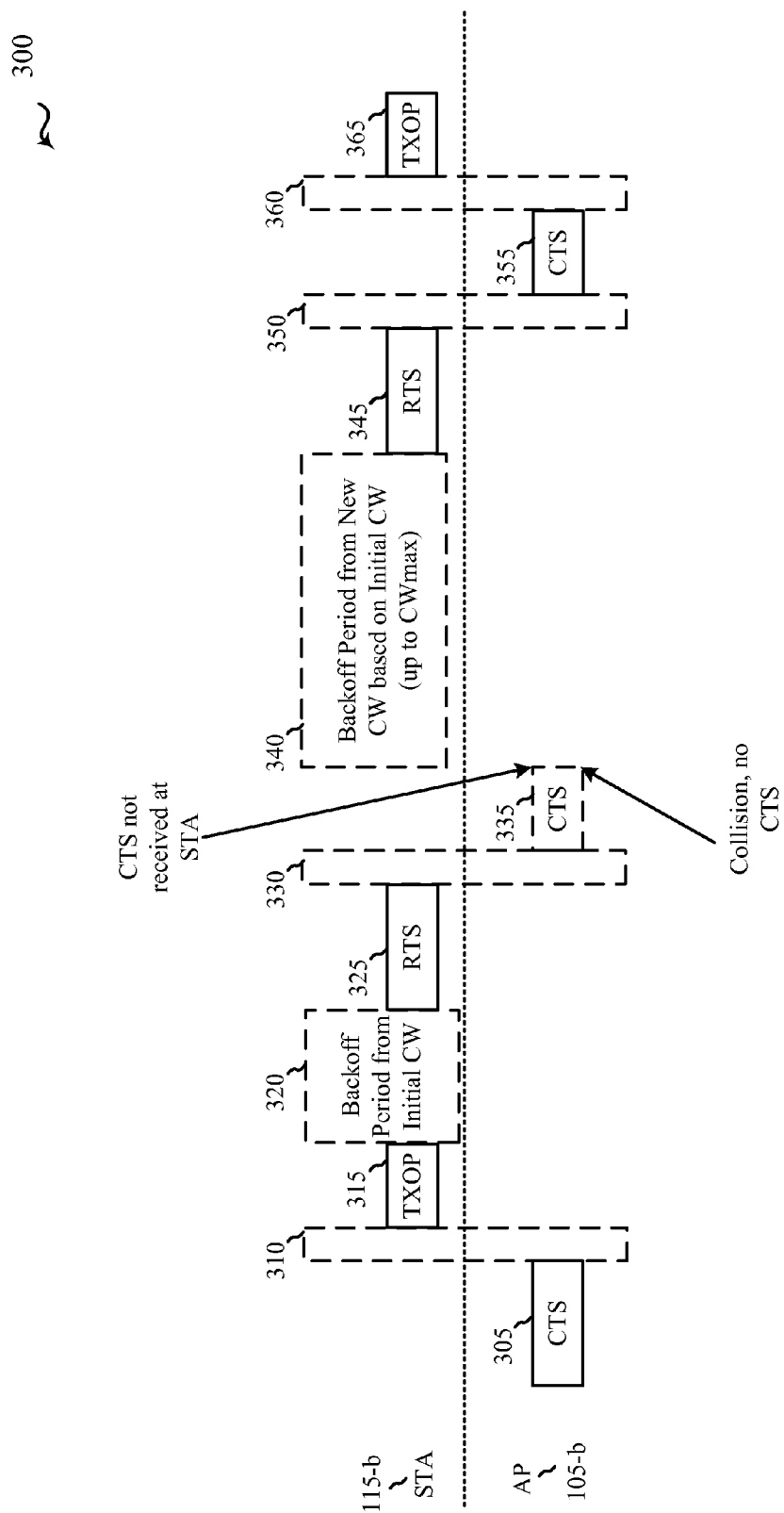
FIG. 3 shows a diagram that illustrates an example of data transmission between an AP and a STA according to various examples.

With reference now to FIG. 3, an example 300 of transmissions between a STA 115-*b* and an AP 105-*b*, such as between STA 115 and AP 105 of FIG. 1 or 2, according to various examples is described. In this example, the STA 115-*b* and the AP 105-*b* may implement RTS/CTS techniques discussed above, and a collision may occur in a RTS transmission, resulting in a new CW being set and new backoff counter being established. In other examples that do not utilize RTS/CTS techniques, a STA 115-*b* may initiate a TXOP directly, and in the absence of an ACK from the AP 105-*b* following a first frame, the STA 115-*b* may determine that a collision has occurred. In the example of FIG. 3, the AP 105-*b* is shown to send a CTS 305 to the STA 115-*b*. After a SIFS, 310, the STA may initiate TXOP 315 to transmit data for a duration of up to a TXOP limit that is established by the AP 105-*b*. In the event that the STA 115-*b* does not have enough data in its buffer to transmit during the assigned TXOP duration, the TXOP may end before the TXOP limit is reached. As mentioned above, however, such shorter transmissions may degrade network efficiency. Following TXOP 315, a backoff period may be determined. The backoff period may be determined in a number of manners, according to various examples. According to some examples, a backoff value may be set directly following a TXOP, and the backoff value may be adjusted to provide longer or shorter time delays based on the utilization of TXOP 315. In other examples, a number of backoff periods may be performed prior to initialization of a subsequent TXOP, with the number of backoffs adjusted based on the utilization of TXOP 315. In further examples, an initial CW size may be set based on the utilization of TXOP 315. For example, if the STA 115-*b* did not transmit data for a predetermined threshold of the TXOP limit, the initial CW size may be increased, thereby potentially increasing the backoff period before a subsequent TXOP. While many of the examples provided herein are directed to the adjustment of a delay time for one or more subsequent TXOPs, the concepts described in such examples apply to other techniques for adjusting the delay time prior to one or more subsequent TXOPs, as will be readily recognized by one of skill in the art.

With continuing reference to FIG. 3, the STA 115-*b* may transmit a RTS 325 following the expiration of the backoff counter and wait a SIFS 330 period for a CTS 335 from the AP 105-*b*. However, because in this example a collision with a RTS from another STA have occurred, the STA 115-*b* does not receive the CTS 335. As a result, the STA 115-*b* sets a new backoff period 340 from a new CW size that is based on the initial CW size. Following the expiration of the backoff period 340, the STA transmits another RTS 345. Again, the STA 115-*b* waits during a SIFS 350 period for a CTS 355 from the AP 105-*b*. Once the STA 115-*b* receives the CTS 355 from the AP 105-*b*, the STA 115-*b* waits for another SIFS period 360, before it begins TXOP 365. In the event that multiple collisions occur, the CW may be increased a number of times up to a value of CWmax, which may be set by the AP based on, for example, an AC of the data that is being transmitted.

Figure 4:
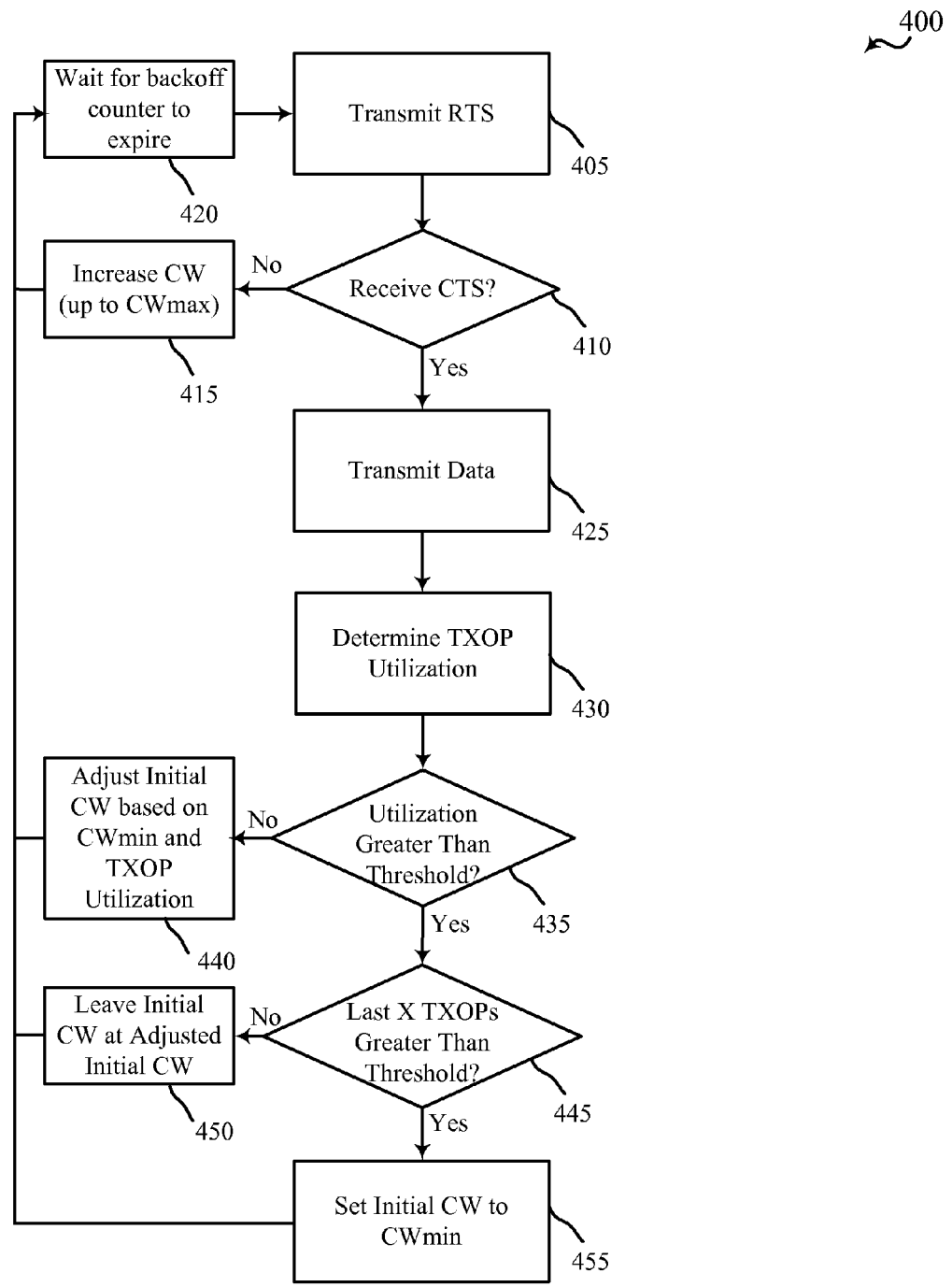
FIG. 4 is a flowchart of an example of operations related to adjusting a contention window (CW) for wireless channel access according to various examples.

With reference now to FIG. 4, a flow diagram of a method 400 for adjusting an initial CW size at a STA is discussed in accordance with various examples. In the example method shown in FIG. 4, a new CW may be obtained by scaling the initial CW based on the actual utilization of the TXOP. In particular, the method disclosed provides for scaling the initial CW when the TXOP is underutilized, which may be the case when the TXOP is too long relative to an actually realized TXOP (i.e. the realized TXOP is too short) or when the TXOP is fully utilized, which may be the case when the realized TXOP duration exceeds a certain preset threshold (i.e. the realized TXOP is too long). The method 400 may be implemented using, for example, the STA 115 of FIGS. 1-3, or devices of FIGS. 7-8 discussed below. As shown in the figure, the method begins at block 405, with the STA transmitting an RTS frame. At block 410, the STA determines if a CTS is received. If the STA determines that the CTS is not received, the STA increases the CW according to usual collision avoidance techniques, up to a limit of CWmax, as indicated at block 415. The STA then waits for a backoff counter that is set based on the CW to expire, as indicated at block 420, and proceeds to execute the operation shown at block 405. If, on the other hand, the STA determines that the CTS is received, it begins to transmit data to the AP during a TXOP, as indicated at block 425. At block 430, the STA determines a utilization of the TXOP. In some examples, the TXOP utilization may be determined based on a TXOP limit duration as compared to a duration of data transmitted (i.e. realized TXOP) at block 425. In other examples, the TXOP utilization may be determined based on an amount of data transmitted during the TXOP as compared to a theoretical maximum amount of data that could be transmitted during the TXOP.

At block 435, the STA determines if the TXOP utilization is greater than a preset threshold. In some examples, the preset threshold may be set by the AP based on AC of the data being transmitted and/or current network conditions. The preset threshold may, according to some examples, be set to 80% of the TXOP limit. If the TXOP utilization is less than the threshold, indicating that the TXOP is being underutilized, the STA may adjust the initial CW based on CWmin and the determined TXOP utilization, as indicated at block

440. In some examples, the adjusted initial CW may be set the CWmin value scaled by the actual TXOP utilization, according to the following formula:

$$\text{adjusted initial } CW = CW\text{min} \times \frac{TXOP \text{ limit}}{\text{realized } TXOP \text{ duration}}$$

The adjusted initial CW will thus result in a larger CW, which on average will cause a longer backoff, and thereby allow more data traffic to be accumulated before the next TXOP. This in turn may cause the subsequent TXOP to be longer and thereby enhance the network utilization. The STA may proceed to execute the operation indicated at block 420 following the adjustment of CW.

At block 445, if the TXOP utilization is greater than the threshold, the STA may determine if the TXOP utilization was greater than the preset threshold for the last X number of TXOPs. According to one example, X may be set to 10, although the value of X may be set to any other value or may be adaptively set by the AP based on current network conditions. In the event the last X TXOPs were not greater than the threshold, the initial CW may be left at the adjusted initial CW, as indicated at block 450. Following the adjustment of the CW, which in the case of the TXOP exceeding the threshold corresponds to a reduction in the CW size, the STA may proceed to execute the operation indicated at block 420. If, on the other hand, it is determined that the last X TXOPs were greater than the TXOP threshold, the initial CW may be set to CWmin corresponding to the particular AC of the data being transmitted, as indicated at block 455. In this manner, a hysteresis is implemented to increase the initial CW in the event a STA is transmitting short bursts of data (i.e. the realized TXOP is too short), while the CW may be set back to CWmin when the STA is transmitting full TXOPs (i.e. the realized TXOP duration exceeds or is equal to a preset threshold).

Figure 5:
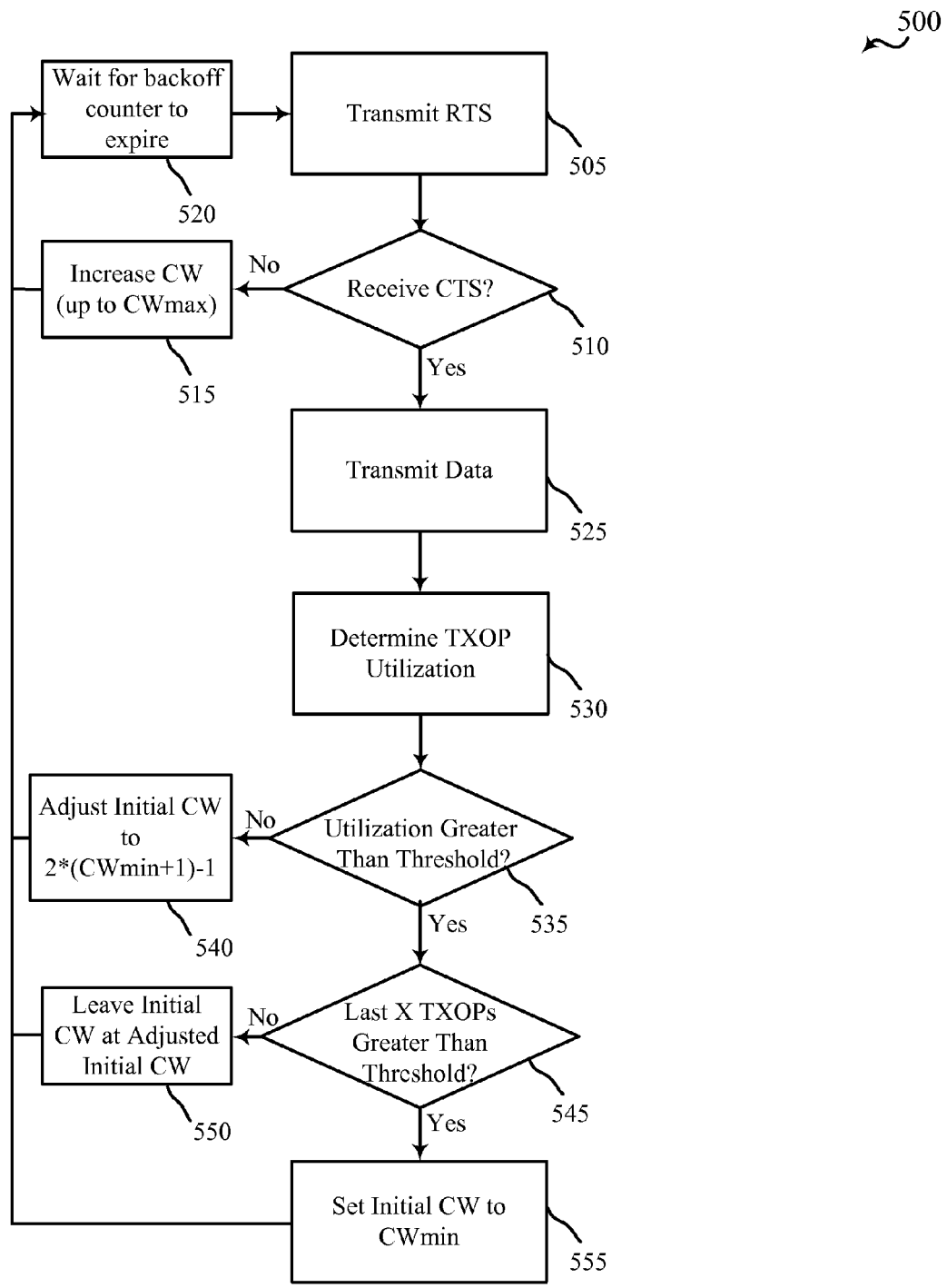
FIG. 5 is another flowchart of an example of operations related to adjusting a CW for wireless channel access according to various examples.

With reference now to FIG. 5, a flow diagram of another method 500 for adjusting an initial CW size at a STA is shown. The CW may serve as an initial CW, which means that it is used for the initial transmission of a frame (i.e. not a retransmission of a frame). According to the example method of FIG. 5, a CW may be adjusted to a predetermined larger initial CW in the event that the TXOP is underutilized. The method 500 may be implemented using, for example, the STAs 115 of FIGS. 1-3, or devices of FIGS. 7-8 discussed below. As shown in the figure, the method begins at block 505, with the STA transmitting an RTS frame. At block 510, the STA determines if a CTS is received. If the STA determines that a CTS is not received, the STA increases the CW according to usual collision avoidance techniques, up to a limit of CWmax, as indicated at block 515. The STA then waits for a backoff counter that is set based on the CW to expire, as indicated at block 520, and proceeds to execute the operation indicated at block 505. If the STA does receive a CTS, it transmits data during a TXOP to the AP, as indicated at block 525. At block 530, the STA determines a utilization of the TXOP. As discussed above, according to some examples the TXOP utilization may be determined based on a TXOP limit duration as compared to a duration of data transmitted at block 525. In other examples, the TXOP utilization may be determined based on an amount of data transmitted during the TXOP as compared to a theoretical maximum amount of data that could be transmitted during the TXOP.

At block 535, the STA determines if the utilization is greater than a preset threshold. In some examples, the preset threshold may be set by the AP based on AC and/or current network conditions. The preset threshold, for examples, may be set to 80% of the TXOP limit, similarly as discussed above. If the TXOP utilization is less than the threshold, the STA may adjust the initial CW by setting the adjusted CW to 2*(CWmin+1)−1, as indicated at block 540, causing the adjusted initial CW to be larger when the TXOP is not sufficiently long. This may lead to an on average longer backoff, which in turn would allow more data traffic to be accumulated before the next TXOP causing the subsequent TXOP to be longer, and thus resulting in an enhanced network utilization. After adjusting the initial CW, the STA may then proceed to execute the operation specified at block 520.

If the TXOP utilization is determined to be greater than the preset threshold at block 535, the STA may proceed to determine if the TXOP exceeded the threshold for the last X number of TXOPs, as indicated at block 545. As discussed above, X may be set to 10, although the value of X may be set to any other value or may be adaptively set by the AP based on current network conditions. If the last X TXOPs were not greater than the threshold, the initial CW may be left at the adjusted initial CW, as indicated at block 550, and operations are continued at block 520. If the last X TXOPs were greater than the TXOP threshold, the initial CW may be set to the CWmin for the particular AC of the data being transmitted, as indicated at block 555. Again, a hysteresis is implemented to increase the initial CW in the event a STA is transmitting short bursts of data, and allowing for the initial CW to be set back to CWmin when the STA is transmitting full TXOPs.

Figure 6:
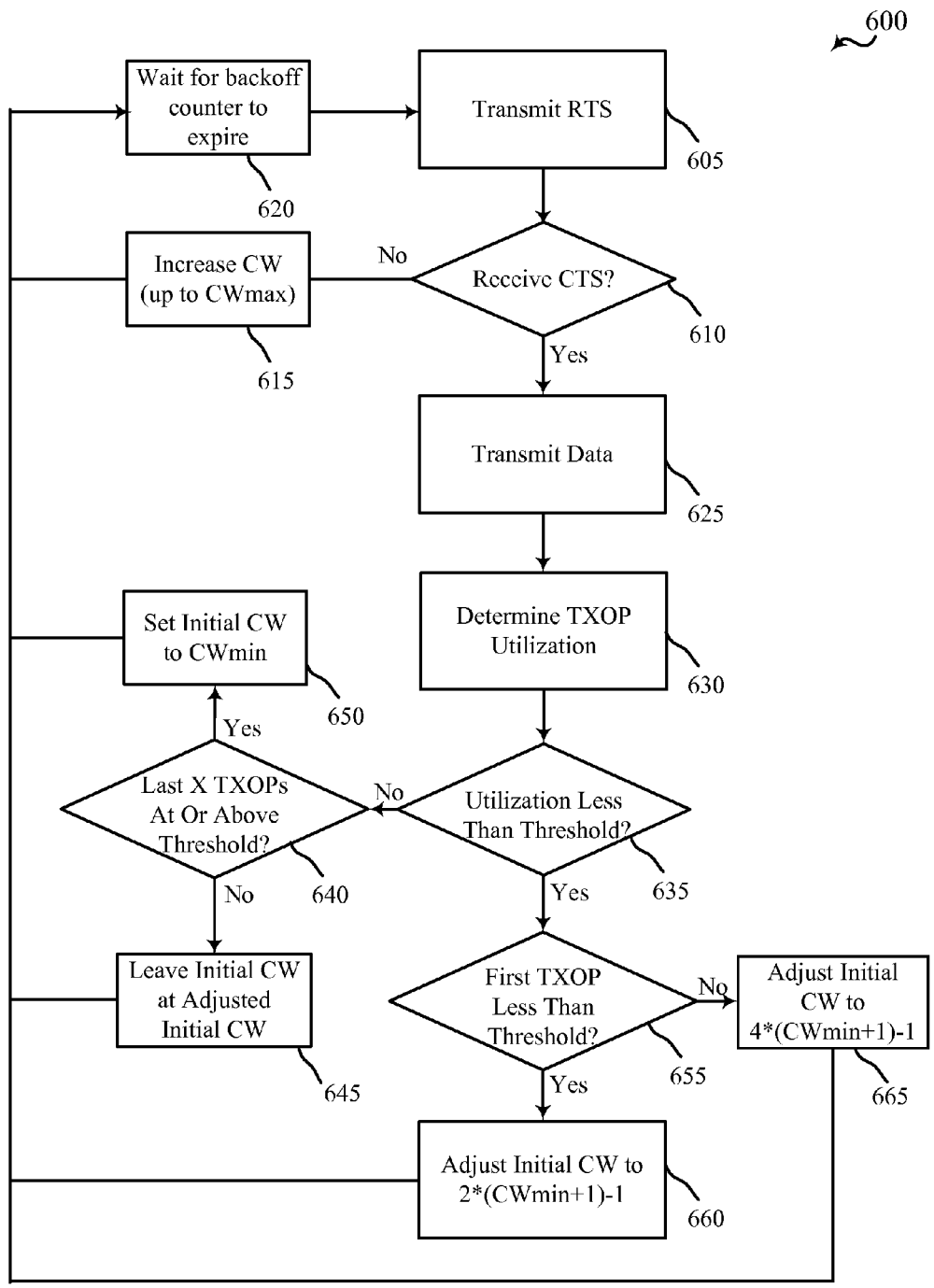
FIG. 6 is another flowchart of an example of operations related to adjusting a CW for wireless channel access according to various examples.

In still further examples, the CW may be adjusted in more than one step to increase an initial CW size following multiple underutilized TXOPs, and may also be adjusted in more than one step to a reduced the initial CW size following one or more TXOPs that are more fully utilized. FIG. 6 illustrates a method 600 of an example that uses two steps to increase the initial CW size. The method 600 may be implemented using, for example, the STAs 115 of FIGS. 1-3, or devices of FIGS. 7-8 discussed below. As shown in the figure, the method begins at block 605, with the STA transmitting an RTS frame. At block 610, the STA determines if a CTS is received. If a CTS is not received, the STA may increase the CW according to usual collision avoidance techniques, up to a limit of CWmax, as indicated at block 615. The STA may then wait for a backoff counter that is set based on the CW to expire, as indicated at block 620, and proceed to execute the operation indicated at block 605. In the event the STA does receive a CTS, it may proceed to transmit data during a TXOP to the AP, as indicated at block 625. Following the TXOP, the STA may determine a utilization of the TXOP as indicated at block 630. As discussed above, in some examples, the TXOP utilization may be determined based on a TXOP limit duration as compared to a duration of data transmitted at block 625. In other examples, the TXOP utilization may be determined based on an amount of data transmitted during the TXOP as compared to a theoretical maximum amount of data that could be transmitted during the TXOP.

At block 635, the STA determines if the utilization is less than a preset threshold. In some examples, the preset threshold may be set by the AP based on the AC and/or current network conditions. The preset threshold in some examples may be set to 80% of the TXOP limit, similarly as discussed above. If the TXOP utilization is at or above the threshold, the STA may determine if the TXOPs were greater than the threshold for the last X number of TXOPs, as indicated at block 640. In some examples, X may be set to 10, but the value of X may be set to any other value or may be adaptively set by the AP based on current network conditions. If the last X TXOPs were not greater than the threshold, the initial CW may be left at the adjusted initial CW, as indicated at block 645, and operations may continue at block 620. If the last X TXOPs are greater than the TXOP threshold, the initial CW may be set to CWmin for the particular AC of data being transmitted, as indicated at block 650.

In the event the STA determines at block 635 that TXOP utilization was less than the threshold, the STA may then proceed to determine if the TXOP is the first TXOP that is less than the threshold, as indicated at block 655. If the TXOP is the first TXOP that is less than the threshold, the STA may adjust the initial CW, such that the adjusted initial CW is determined according to 2*(CWmin+1)−1, as indicated at block 660, and operations may continue with block 620. If the TXOP is not the first TXOP that is less than the threshold, the STA may further adjust the initial CW, such that the adjusted initial CW is determined according to 4*(CWmin+1)−1, as indicated at block 665, and operations may continue with block 620. The initial CW may thus be adjusted in two steps, which will result in larger contention windows based on the particular traffic of the STA, which on average will cause a longer backoff, and thereby allow more data traffic to be accumulated before the next TXOP.

Figure 7:
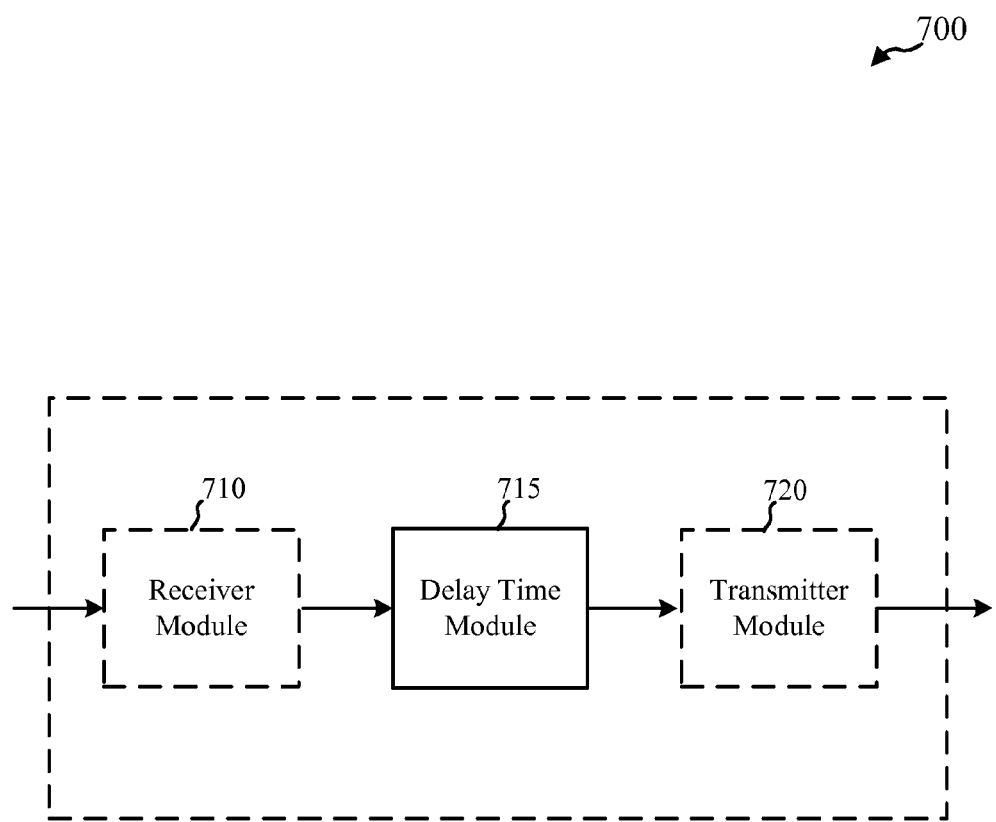
FIG. 7 shows a block diagram that illustrates an example of an architecture for adjusting CW according to various examples.

With reference now to FIG. 7, a block diagram illustrates a device 700 that may be used to delay time as disclosed by the various examples discussed above. The device 700 may be an example of one or more aspects of the APs 105 or STAs 115 described with reference to FIGS. 1-2, or FIGS. 8-9 as will be described below. The device 700, or portions of it, may also be a processor. The device 700 may include a receiver module 710, a delay time module 715, and/or a transmitter module 720. Each of these components may be in communication with each other. The device 700, through the receiver module 710, the delay time module 715, and/or the transmitter module 720, may be configured to transmit TXOPs according to timing determined based on prior TXOP utilization in order to transmit TXOPs having higher utilization, similarly as discussed above with respect to FIGS. 2-6.

Figure 8:
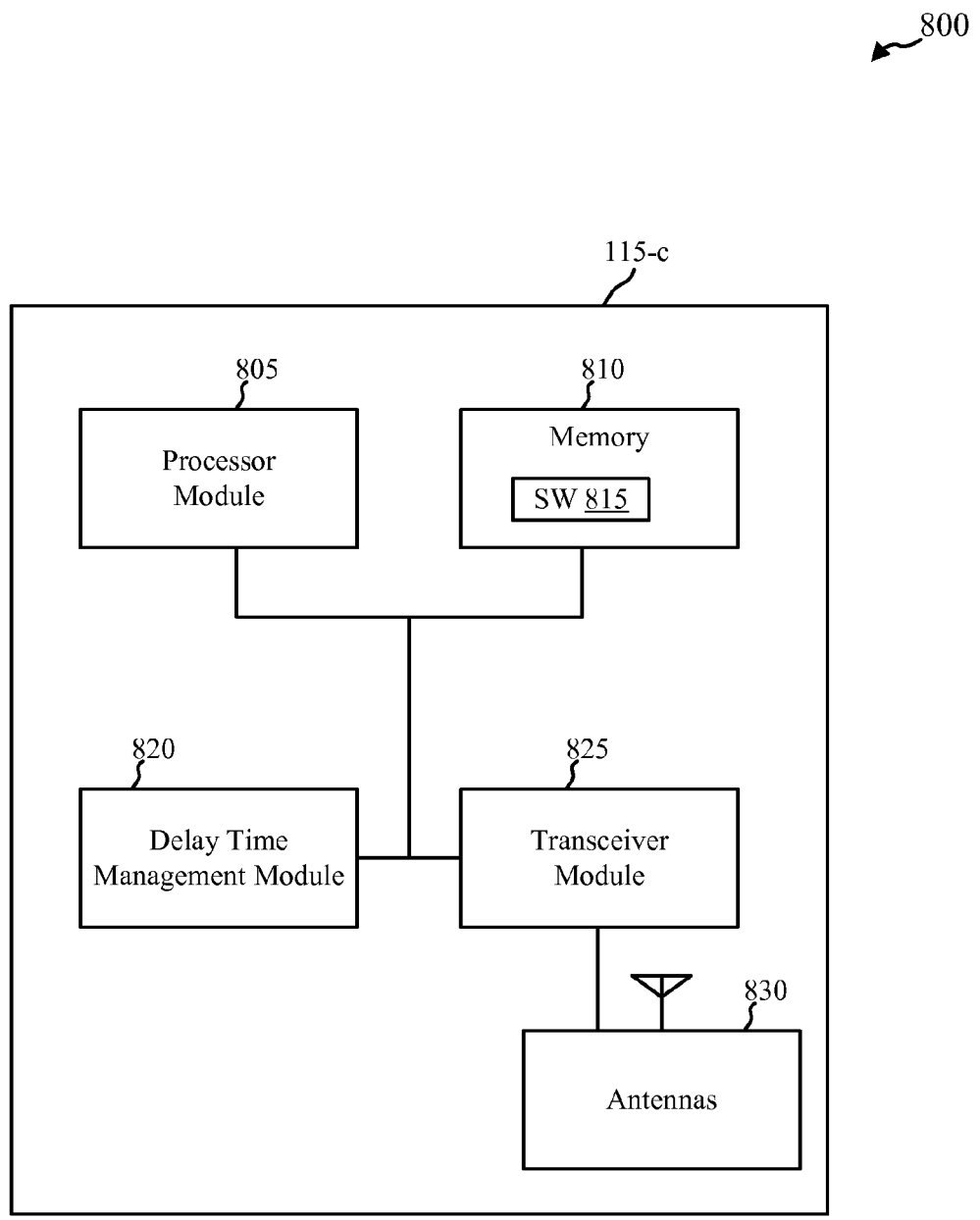
FIG. 8 shows a block diagram that illustrates an example of a STA architecture according to various examples.

Turning to FIG. 8, a diagram 800 is shown that illustrates a STA 115-*c* configured for delay time adjustment based on TXOP utilization according to various examples. The STA 115-*c* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The STA 115-*c* may have an internal power supply (not shown), such as a small battery, to facilitate mobile operation. The STA 115-*c* may be an example of the STAs 115 and may implement various operations of FIGS. 1-6.

The STA 115-*c* may include a processor module 805, a memory module 810, a transceiver module 825, antennas 830, and a delay time management module 820. The delay time management module 820 may be an example of the delay time module 715 of FIG. 7. Each of these components may be in communication with each other, directly or indirectly, over one or more buses for example.

The memory module 810 may include RAM and ROM. The memory module 810 may store computer-readable, computer-executable software (SW) code 815 containing instructions that are configured to, when executed, cause the processor module 805 to perform various functions described herein for delay time adjustments. Alternatively, the software code 815 may not be directly executable by the processor module 805 but be configured to cause the computer (e.g., when compiled and executed) to perform functions described herein.

The processor module 805 may include an intelligent hardware device, e.g., a CPU, a microcontroller, an ASIC, etc. The processor module 805 may process information received through the transceiver module 825 and/or to be sent to the transceiver module 825 for transmission through the antennas 830. The processor module 805 may handle, alone or in connection with the delay time management module 820, various aspects for TXOP utilization and delay time adjustment based on TXOP utilization as described herein.

The transceiver module 825 may be configured to communicate bi-directionally with APs 105 in FIGS. 1-2. The transceiver module 825 may be implemented as one or more transmitter modules and one or more separate receiver modules. The transceiver module 825 may include a modem configured to modulate the packets and provide the modulated packets to the antennas 830 for transmission, and to demodulate packets received from the antennas 830. While the STA 115-*c* may include a single antenna, there may be examples in which the STA 115-*c* may include multiple antennas 830.

The components of the STA 115-*c* may be configured to implement aspects discussed above with respect to FIGS. 2-7, and those aspects may not be repeated here for the sake of brevity. Moreover, the components of the STA 115-*c* may be configured to implement aspects discussed below with respect to FIGS. 9-13, and those aspects may not be repeated here also for the sake of brevity.

Figure 9:
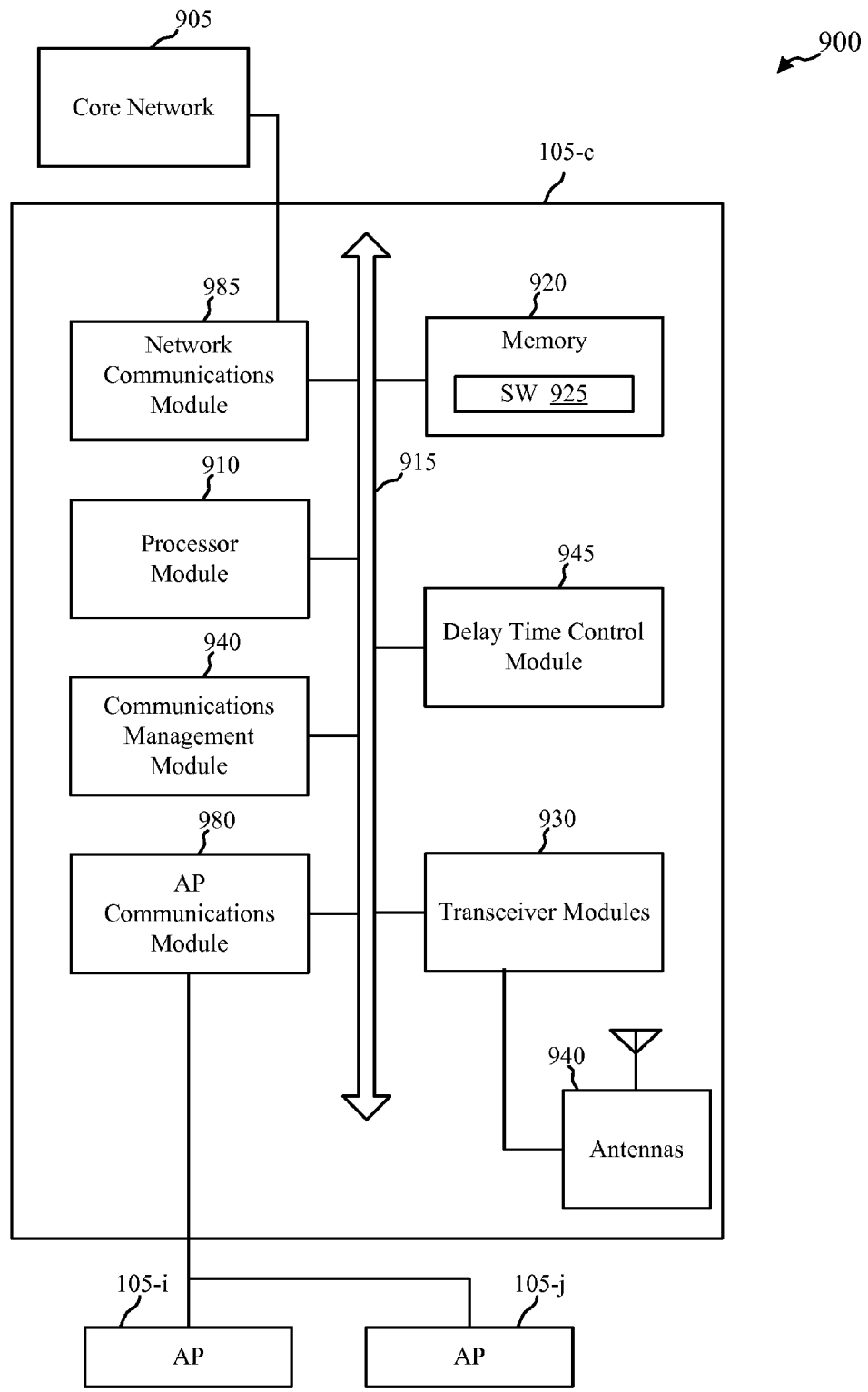
FIG. 9 shows a block diagram that illustrates an example of an AP architecture according to various examples.

Turning to FIG. 9, a diagram 900 is shown that illustrates an AP 105-*c* configured for delay time management according to various examples. In some examples, the AP 105-*c* may be an example of the APs 105 of FIGS. 1-2. The AP 105-*c* may include a processor module 910, a memory module 920, a transceiver module 930, antennas 940, and a delay time control module 945. The delay time control module 945 may be an example of the delay time module 715 of FIG. 7. In some examples, the AP 105-*c* may also include one or both of an APs communications module 980 and a network communications module 985. Each of these components may be in communication with each other, directly or indirectly, over one or more buses 915.

The memory module 920 may include random access memory (RAM) and read-only memory (ROM). The memory module 920 may also store computer-readable, computer-executable software (SW) code 925 containing instructions that are configured to, when executed, cause the processor module 910 to perform various functions described herein for delay time management by an AP (e.g., TXOP limits, delay time adjustment following underutilized TXOPs per access class, etc.). Alternatively, the software code 925 may not be directly executable by the processor module 910 but be configured to cause the computer, e.g., when compiled and executed, to perform functions described herein.

The processor module 910 may include an intelligent hardware device, e.g., a central processing unit (CPU), a microcontroller, an application-specific integrated circuit (ASIC), etc. The processor module 910 may process information received through the transceiver module 930, the APs communications module 980, and/or the network communications module 985. The processor module 910 may also process information to be sent to the transceiver module 930 for transmission through the antennas 940, to the APs communications module 980, and/or to the network communications module 985. The processor module 910 may handle, alone or in connection with delay time control module 945, various aspects related to delay time management and adjustment as discussed above.

Figure 12:
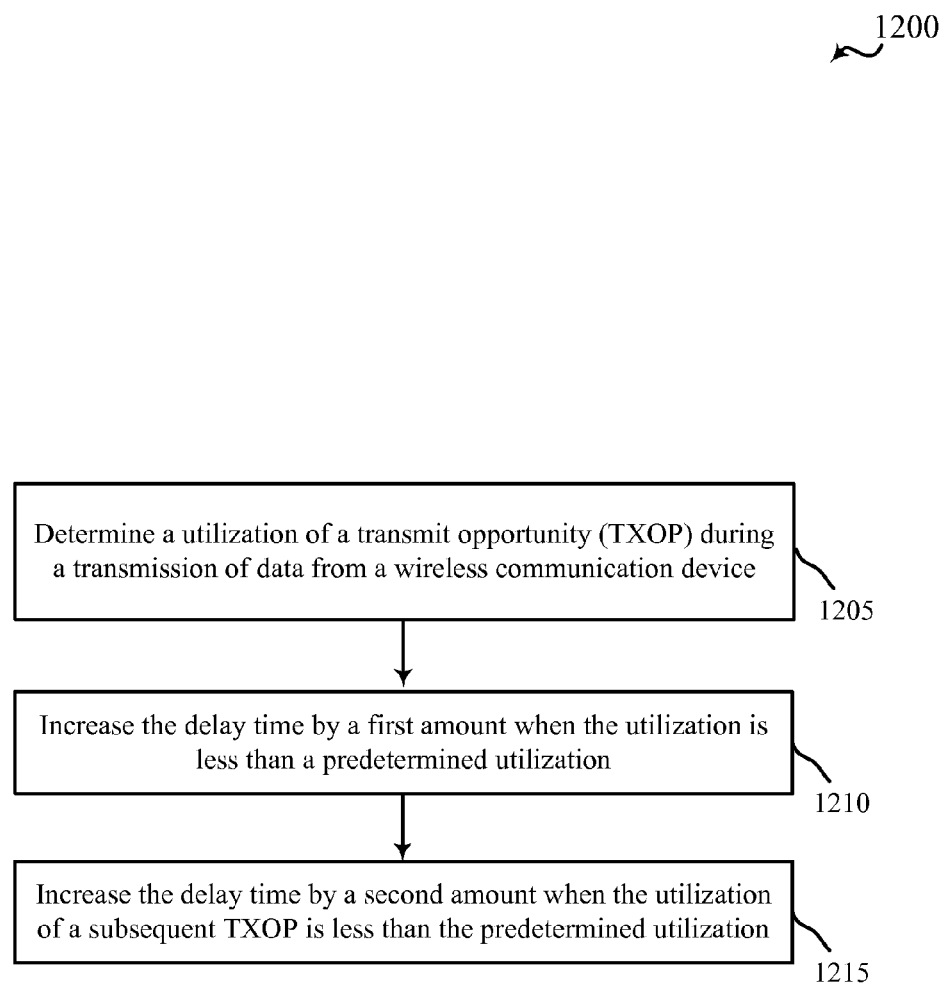
FIG. 12 is a flowchart of an example of yet another method for delay time adjustment in a wireless communication system according to various examples.

The transceiver module 930 may include a modem configured to modulate the packets and provide the modulated packets to the antennas 940 for transmission, and to demodulate packets received from the antennas 940. The transceiver module 930 may be implemented as one or more transmitter modules and one or more separate receiver modules. The transceiver module 930 may be configured to communicate bi-directionally, via the antennas 940, with one or more STAs 115 as illustrated in FIG. 1 or FIG. 12, for example. The AP 105-*c* may typically include multiple antennas 940 (e.g., an antenna array). The AP 105-*c* may communicate with a core network 905 through the network communications module 985. The AP 105-*c* may communicate with other APs, such as the AP 105-*i* and the AP 105-*j*, using an AP communications module 980.

According to the architecture of FIG. 9, the AP 105-*c* may further include a communications management module 940. The communications management module 940 may manage communications with STAs and/or other devices as illustrated in the WLAN network 100 of FIG. 1, for example. The communications management module 940 may be in communication with some or all of the other components of the AP 105-*c* via the bus or buses 915. Alternatively, functionality of the communications management module 940 may be implemented as a component of the transceiver module 930, as a computer program product, and/or as one or more controller elements of the processor module 910.

The components of the AP 105-*c* may be configured to implement aspects discussed above with respect to FIGS. 2-8, and those aspects may not be repeated here for the sake of brevity. Moreover, the components of the AP 105-*c* may be configured to implement aspects discussed below with respect to FIGS. 10-13 and those aspects may not be repeated here also for the sake of brevity.

Figure 10:
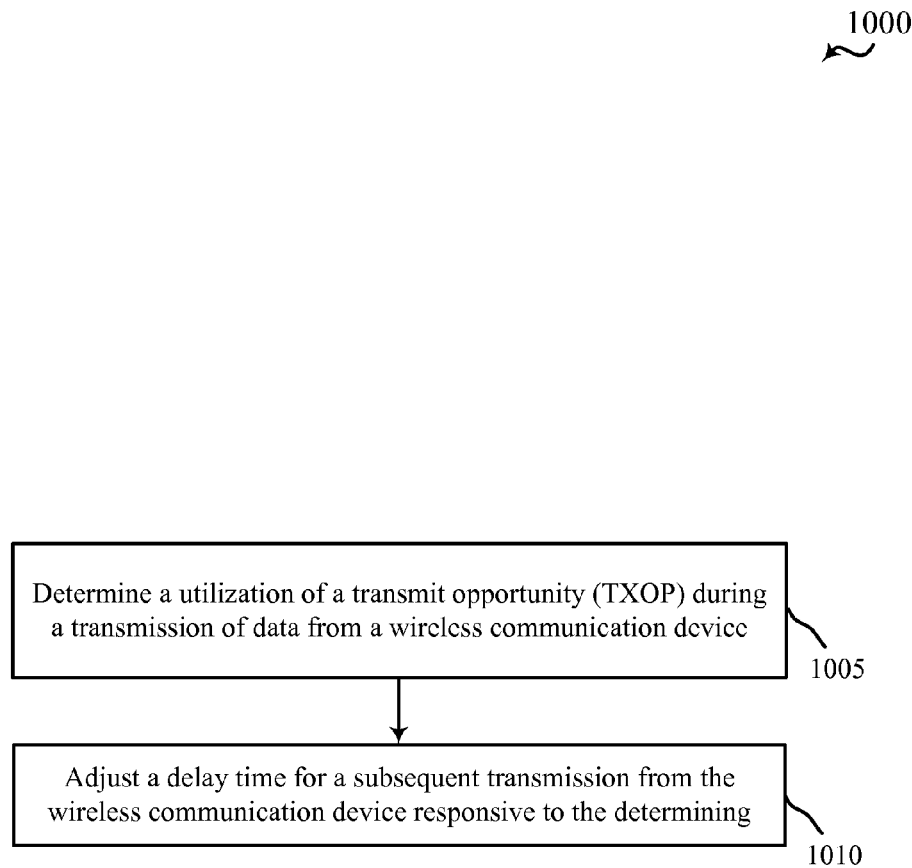
FIG. 10 is a flowchart of an example of a method for delay time adjustment in a wireless communication system according to various examples.

Turning next to FIG. 10, a flow diagram is described for a method 1000 for delay time adjustment based on TXOP utilization in accordance with various examples. The method 1000 may be implemented using, for example, STAs 115 of FIG. 1-2 or 8; or the device 700 of FIG. 7. As shown in the figure, the method begins at block 1005, with the STA determining a utilization of a transmit opportunity (TXOP) during a transmission of data from a wireless communication device. At block 1010, the STA may adjust a delay time for a subsequent transmission from the wireless communication device responsive to the determining. In some examples, similarly as described above, the STA may adjust a CW, a backoff time, and/or a number of backoffs, for example, based on TXOP utilization to enhance the efficiency of the wireless communications system.

Figure 11:
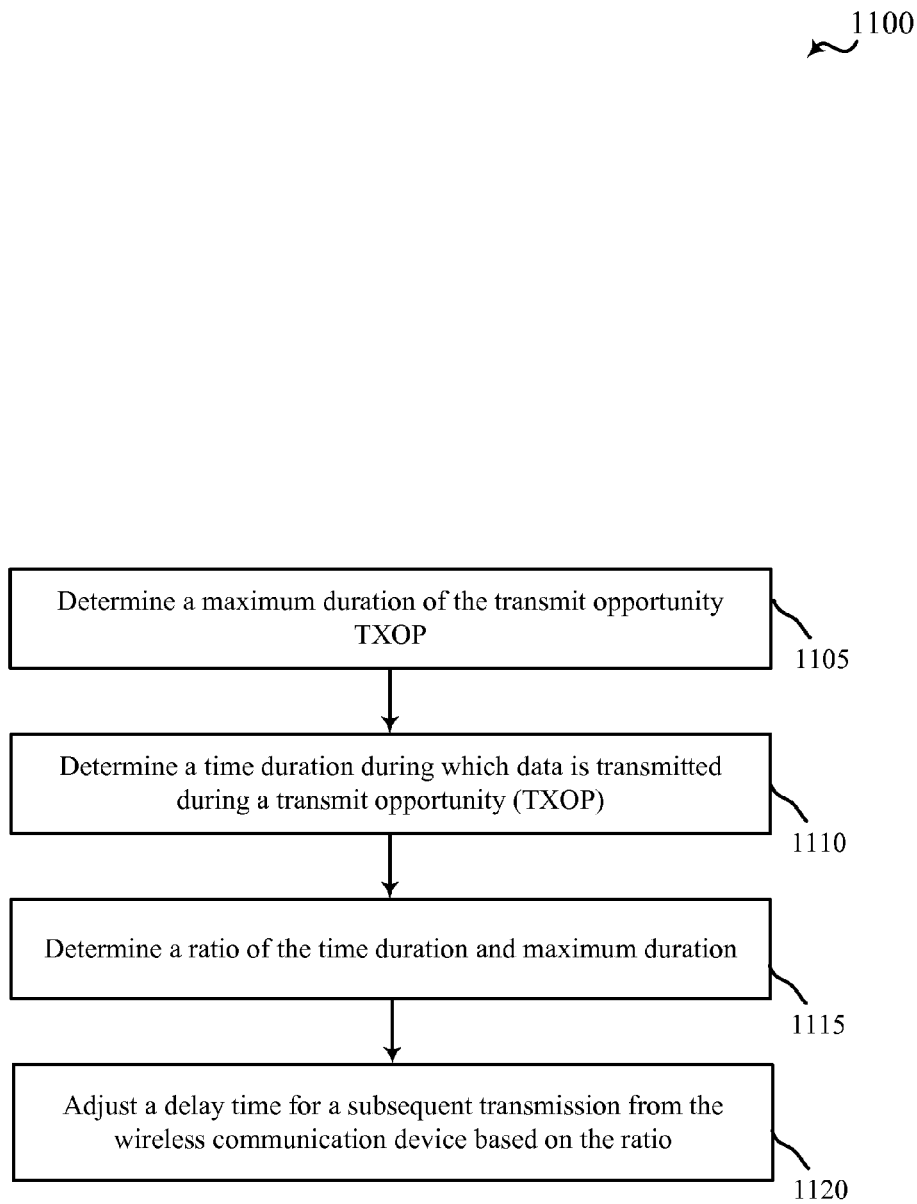
FIG. 11 is a flowchart of an example of another method for delay time adjustment in a wireless communication system according to various examples.

Turning next to FIG. 11, a flow diagram is described for a method 1100 for delay time adjustment in accordance with various examples. The method 1100 may be implemented using, for example, STAs 115 of FIG. 1-2 or 8; or the device 700 of FIG. 7. As shown in the figure, the method begins at block 1105, with the STA determining a maximum duration of the transmit opportunity TXOP. The STA may then determine a time duration during which data is transmitted during a transmit opportunity (TXOP), according to block 1110. At block 1115, the STA may determine a ratio of the time duration and the maximum duration. Finally, at block 1120, the STA may adjust a delay time for a subsequent transmission from the wireless communication device based on the ratio. According to some examples, such as discussed above, delay time may be adjusted by adjusting the CW for one or more subsequent TXOPs by scaling the CW according to the utilization ratio of the previous TXOP. In other examples, such as discussed above, the STA may be required to perform one or more additional backoffs before initiating a next TXOP when a previous TXOP was underutilized. In further examples, also discussed above, the STA may increase an average backoff value before initiating a next TXOP when a previous TXOP was underutilized. Following a certain number of TXOPs that are more fully utilized, the delay time may be decreased to a lower value.

Turning next to FIG. 12, a flow diagram is described for a method 1200 for delay time adjustment based on TXOP utilization in accordance with various examples. The method 1200 may be implemented using, for example, the STAs 115 of FIG. 1-2 or 8; or the device 700 of FIG. 7, for example. As shown in the figure, the method begins at block 1205, with the STA determining a utilization of a transmit opportunity (TXOP) during a transmission of data. At block 1210, the STA may increase the delay time value by a first amount when the utilization is less than a predetermined utilization. At block 1215, the STA may increase the delay time value by a second amount when the utilization of a subsequent TXOP is less than the predetermined utilization. Thus, this method provides that the delay time may be adjusted in two (or more) steps based on TXOP utilization. Following a certain number of TXOPs that are more fully utilized, the delay time may be decreased, in one or more steps, to a lower, or minimum, value.

Figure 13:
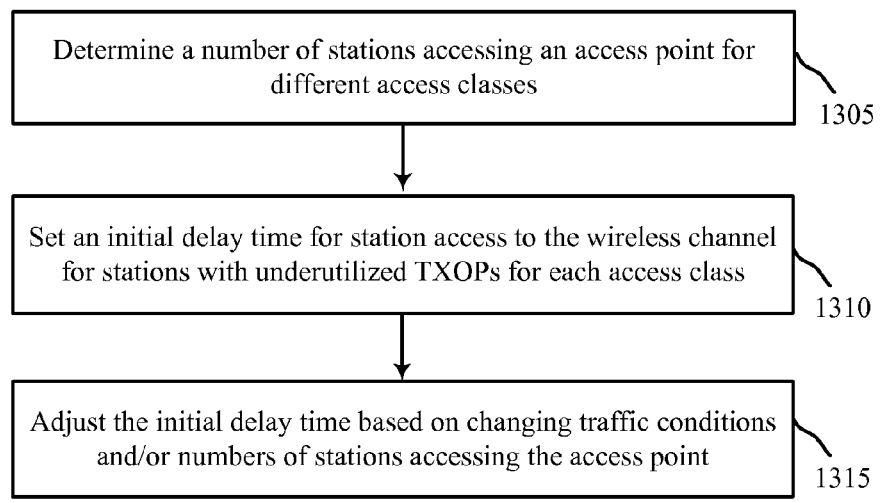
FIG. 13 is a flowchart of an example of a method for dynamic control of delay time in a wireless communication system according to various examples.

Turning next to FIG. 13, a flow diagram is described for a method 1300 for delay time management based on TXOP utilization in accordance with various examples. The method 1300 may be implemented using, for example, the APs 105 of FIG. 1-2 or 9; or the device 700 of FIG. 7, for example. At block 1305, the AP may determine a number of STAs accessing an AP for different ACs. At block 1310, the AP may set an initial delay time, such as through setting an initial CW value, for STA access to the wireless channel for STAs with underutilized TXOPs according to each AC. For example, an AP may determine that current traffic conditions are significantly less than the total capacity of the AP, and may set initial CWs to be a relatively low value or to simply be CWmin. In other cases, the AP may determine that current traffic conditions are approaching the maximum capacity of the AP, and may accordingly set initial CWs to be a higher value in order to attempt to reduce underutilized TXOPs and reduce contention between STAs and thereby enhance the utilization of the wireless medium. Finally, at block 1315, the AP may adjust the initial delay time based on changing traffic conditions and/or numbers of STAs accessing the AP. Thus, if traffic conditions change from the AP having a significant amount of available capacity to a relatively small amount of available capacity, the AP may adjust the delay time for STAs following underutilized TXOPs in order to reduce underutilized TXOPs.

The detailed description set forth above in connection with the appended drawings describes exemplary examples and does not represent the only examples that may be implemented or that are within the scope of the claims. The term "exemplary" when used in this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   determining a utilization of a transmit opportunity (TXOP) during a transmission of data from a wireless communication device;
   adjusting a delay time for a subsequent transmission from the wireless communication device based at least in part on the determined utilization, wherein adjusting the delay time comprises one from the group consisting of:
   increasing the delay time when the utilization is less than a first predetermined utilization; and
   decreasing the delay time when the utilization is greater than a second predetermined utilization; and
   wherein adjusting the delay time comprises adjusting an initial contention window (CW) value for the subsequent transmission.

2. The method of claim 1, wherein adjusting the delay time further comprises:
   adjusting a parameter selected from the group consisting of: a backoff value for the subsequent transmission, or a number of backoffs before initiating the subsequent transmission.

3. The method of claim 1, wherein adjusting the delay time comprises:
   decreasing the delay time when the utilization is greater than the second predetermined utilization and the utilization of a predetermined number of previous TXOPs are each greater than the second predetermined utilization.

4. The method of claim 1, wherein the determining comprises determining a time duration during which data is transmitted during the TXOP,
   wherein the adjusting the delay time comprises increasing the delay time when the time duration is shorter than a predetermined time duration.

5. The method of claim 1, wherein the determining comprises:
   determining a maximum duration of the TXOP;
   determining a time duration during which data is transmitted during the TXOP; and
   determining a ratio of the time duration and the maximum duration.

6. The method of claim 5, wherein adjusting the delay time comprises:

increasing the delay time when the ratio is less than a predetermined ratio.

7. The method of claim 1, wherein adjusting the delay time comprises:
adjusting the delay time to allow for accumulation of additional data prior to the subsequent transmission relative to an amount of data accumulated using an unadjusted delay time.

8. The method of claim 1, wherein adjusting the delay time comprises:
scaling the delay time according to the utilization of the TXOP.

9. The method of claim 1, wherein adjusting the delay time comprises:
increasing the delay time by a first amount when the utilization is less than the first predetermined utilization; and
increasing the delay time by a second amount when the utilization of a subsequent TXOP is less than the first predetermined utilization.

10. The method of claim 1, further comprising:
determining a second utilization of a subsequent TXOP during the subsequent transmission from the wireless communication device; and
re-adjusting the delay time responsive to the utilization and the second utilization.

11. The method of claim 10, wherein the re-adjusting the delay time comprises:
resetting the delay time to a minimum value when the second utilization is greater than a third predetermined utilization.

12. The method of claim 10, wherein the re-adjusting the delay time comprises:
further increasing the delay time when the second utilization is less than a fourth predetermined utilization.

13. An apparatus for wireless communications, comprising:
means for determining a utilization of a transmit opportunity (TXOP) during a transmission of data from a wireless communication device;
means for adjusting a delay time for a subsequent transmission from the wireless communication device based at least in part on the determined utilization, wherein the means for adjusting the delay time comprises one from the group consisting of:
means for increasing the delay time when the utilization is less than a first predetermined utilization; and
means for decreasing the delay time when the utilization is greater than a second predetermined utilization; and
wherein adjusting the delay time comprises adjusting an initial contention window (CW) value for the subsequent transmission.

14. The apparatus of claim 13, wherein the means for adjusting the delay time further comprises means for adjusting a parameter selected from the group consisting of:
a backoff value for the subsequent transmission or a number of backoffs before initiating the subsequent transmission.

15. The apparatus of claim 13, wherein the means for adjusting the delay time comprises:
means for decreasing the delay time when the utilization is greater than the second predetermined utilization and the utilization of a predetermined number of previous TXOPs are each greater than the second predetermined utilization.

16. The apparatus of claim 13, wherein the means for determining comprises means for determining a time duration during which data is transmitted during the TXOP; and
wherein the means for adjusting the delay time comprises means for increasing the delay time when the time duration is shorter than a predetermined time duration.

17. The apparatus of claim 13, wherein the means for determining comprises:
means for determining a maximum duration of the TXOP;
means for determining a time duration during which data is transmitted during the TXOP; and
means for determining a ratio of the time duration and the maximum duration.

18. The apparatus of claim 13, wherein the means for adjusting the delay time comprises:
means for adjusting the delay time to allow for accumulation of additional data prior to the subsequent transmission relative to an amount of data accumulated using an unadjusted delay time.

19. The apparatus of claim 13, wherein the means for adjusting the delay time comprises:
means for scaling the delay time according to the utilization of the TXOP.

20. The apparatus of claim 13, wherein the means for adjusting the delay time comprises:
means for increasing the delay time by a first amount when the utilization is less than the first predetermined utilization; and
means for increasing the delay time by a second amount when the utilization of a subsequent TXOP is less than the first predetermined utilization.

21. The apparatus of claim 13, further comprising:
means for determining a second utilization of a subsequent TXOP during the subsequent transmission from the wireless communication device; and
means for re-adjusting the delay time responsive to the utilization and the second utilization.

22. The apparatus of claim 21, wherein the means for re-adjusting the delay time comprises:
means for resetting the delay time to a minimum value when the second utilization is greater than a third predetermined utilization; and
means for further increasing the delay time when the second utilization is less than a fourth predetermined utilization.

23. An apparatus for wireless communication, comprising:
a transmitter configured to transmit data to an access point during a transmit opportunity (TXOP);
a delay time manager configured to determine a utilization of the TXOP during the transmission of data from a wireless communication device and adjust a delay time value for a subsequent transmission responsive to the determining, wherein adjusting the delay time comprises one from the group consisting of:
increasing the delay time when the utilization is less than a first predetermined utilization; and
decreasing the delay time when the utilization is greater than a second predetermined utilization; and
wherein adjusting the delay time comprises adjusting an initial contention window (CW) value for the subsequent transmission.

24. The apparatus for wireless communication of claim 23, wherein the adjusting the delay time further comprises:

adjusting a parameter selected from the group consisting of: a backoff value for the subsequent transmission or a number of backoffs before initiating the subsequent transmission.

25. A non-transitory computer-readable medium comprising computer-readable program code stored thereon, the computer-readable program code when executed by at least one processor to cause the at least one processor to:
- determine a utilization of a transmit opportunity (TXOP) during a transmission of data from a wireless communication device;
- adjust a delay time for a subsequent transmission from the wireless communication device based at least in part on the determined utilization, wherein the code to cause the at least one processor to adjust the delay time further comprises one from the group consisting of:
- code to cause the at least one processor to increase the delay time when the utilization is less than a first predetermined utilization; and
- code to cause the at least one processor to decrease the delay time when the utilization is greater than a second predetermined utilization; and
- wherein adjusting the delay time comprises adjusting an initial contention window (CW) value for the subsequent transmission.

26. The non-transitory computer-readable medium of claim 25 wherein the computer-readable program code further causes the at least one processor to adjust a parameter selected from the group consisting of:
- a backoff value for the subsequent transmission, or a number of backoffs before initiating the subsequent transmission.

\* \* \* \* \*